United States Patent [19]
Perkins

[11] 3,948,470
[45] Apr. 6, 1976

[54] SYSTEM FOR IMPOSING DIRECTIONAL STABILITY ON A ROCKET-PROPELLED VEHICLE

[75] Inventor: Harold Perkins, Huntsville, Ala.

[73] Assignee: The United States of America as represented by the Administrator of the National Aeronautics and Space Administration, Washington, D.C.

[22] Filed: July 31, 1974

[21] Appl. No.: 493,359

[52] U.S. Cl. .............................................. 244/3.22
[51] Int. Cl.² ........................................... B64C 15/00
[58] Field of Search .................................. 244/3.22

[56] References Cited
UNITED STATES PATENTS

| | | | |
|---|---|---|---|
| 3,048,011 | 8/1962 | Tumavicus | 244/3.22 |
| 3,113,520 | 12/1963 | Geissler et al. | 244/3.22 |
| 3,532,304 | 10/1970 | Pyptiuk | 244/3.22 |

*Primary Examiner*—Verlin R. Pendegrass
*Attorney, Agent, or Firm*—Wayland H. Riggins; L. D. Wofford, Jr.; John R. Manning

[57] ABSTRACT

An improved system for use in imposing directional stability on a rocket-propelled vehicle. The system includes a pivotally supported engine-mounting platform, a gimbal ring mounted on the platform and adapted to pivotally support a rocket engine, an hydraulic actuator connected to the platform for imparting thereto selected pivotal motion, an accelerometer and a signal comparator circuit for providing error intelligence indicative of aberration in vehicle acceleration, and an actuator control circuit connected with the actuator and responsive to error intelligence for imparting pivotal motion to the platform, whereby a relocation of the engine's thrust vector is achieved for imparting directional stability to the vehicle.

3 Claims, 9 Drawing Figures

U.S. Patent  April 6, 1976  Sheet 1 of 2  3,948,470
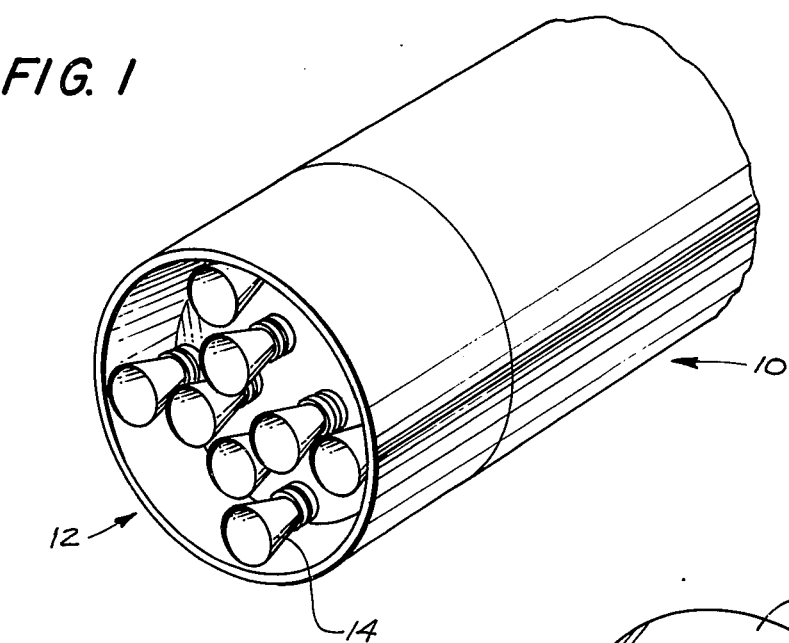
FIG. 1
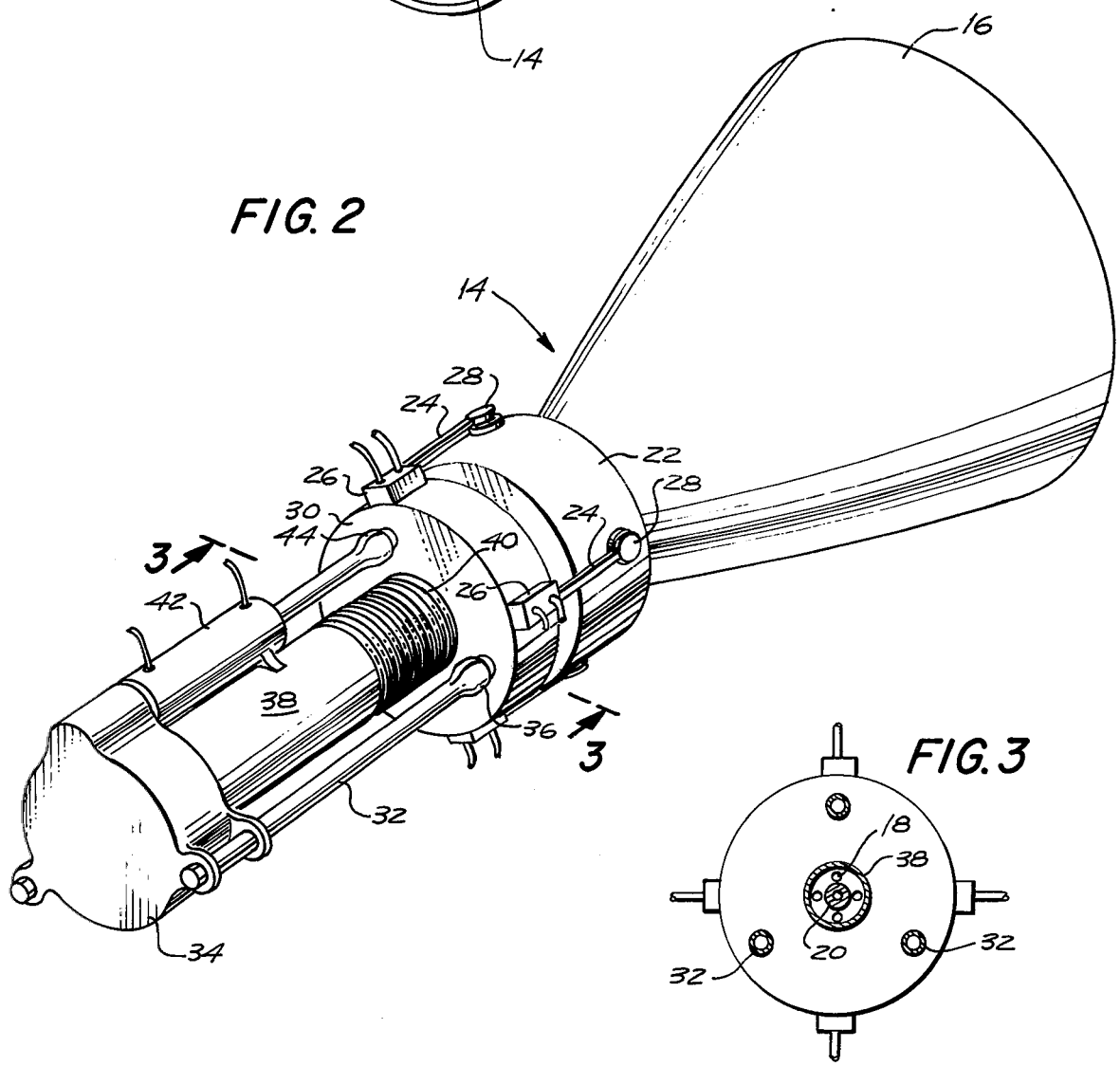
FIG. 2
FIG. 3

SYSTEM FOR IMPOSING DIRECTIONAL STABILITY ON A ROCKET-PROPELLED VEHICLE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention generally relates to supports for rocket engines, and more particularly to an improved system for pivotally displacing an engine-mounting platform, whereby a relocation of the engine's thrust vector relative to the vehicle's center of gravity is achieved.

It is, of course, recognized that maximum thrust is achievable for a multi-engine system when the thrust vectors are arranged in parallelism. However, for reasons fully appreciated by those familiar with the design and operation of rocket-propelled vehicles, it is considered to be impossible to mount multiple engines in a manner such that the thrust vector of more than one engine will pass through the center of gravity of the vehicle and yet be oriented in parallelism with the vehicle's line of flight. This design restriction has lead to numerous problems encountered during in-flight operations. For example, it is not uncommon to experience an abort resulting from failure of one engine during stage thrust operation.

In order to avoid loss of directional control, such as tumbling and the like, as a consequence of engine malfunction in a multi-engine system, it is common practice to shut down the engine opposite the failing engine, or to increase the thrust of the remaining engines on the same side of the vehicle. Either of these alternatives are undesirable for obvious reasons. While it is possible to partially overcome this problem by pre-positioning thrust vectors to pass through the center of gravity, it has been found for vehicles having engine thrust vectors pre-positioned through some nominal center of gravity, two problems generally are encountered. The first being that the resultant thrust is never as great as it is for vehicles having engine thrust vectors pre-positioned in parallelism, and secondly, the center of gravity tends to shift continuously throughout stage operation, because of propellant depletion and similarly initiated changes in mass. Consequently, even where the thrust vectors are extended through a nominal center of gravity, it is apparent that only at one point in stage operation are the pre-positioned thrust vectors in fact extended through the center of gravity.

It has been suggested that engine gimbal actuators larger than are required for nominal operational control be provided for achieving thrust vector relocation. However, the mass and complexity of such gimbal actuator systems tend to render their use impractical.

Because of the existence of these various problems and alternative trade-offs, designers of rocket-propelled vehicles continuously are faced with the decision of whether to orient thrust vectors in parallelism or to arrange the engines so that the thrust vectors are extended through the center of gravity of the vehicle.

It is therefore the general purpose of the instant invention to provide an improved system for a rocket-propelled vehicle through which a selective relocation of the thrust vectors for rocket engines is facilitated whereby maximum thrust may be achieved and directional stability afforded the vehicle.

OBJECTS AND SUMMARY OF THE INVENTION

It is therefore an object of the instant invention to provide an improved system for achieving maximum thrust while imposing directional stability for rocket-propelled vehicles.

It is another object to provide an improved system through which may be achieved a relocation of thrust vectors for accommodating both parallel and center-of-gravity thrust vector orientation.

It is another object to provide an improved system through which it is possible to achieve directional stability in the event of engine failure, without requiring engine shut-down or over-thrusting of residual engines.

It is another object to provide in a system for use in achieving directional stability for rocket-propelled vehicles a system through which parallel thrust alignment is accommodated, during normal engine operation, and center-of-gravity thrust alignment is accommodated in the event engine failure is experienced in in-flight operation.

These and other objects and advantages are achieved through a pivotally supported engine mounting platform, adapted to receive and support a gimbaled rocket engine, and an actuator connected with the platform for selectively imparting pivotal motion to the platform in response to directional error correction signals for thereby altering the orientation of the thrust vector of the rocket engine for thus achieving directional stability.

BRIEF DESCRIPTION OF THE DRAWINGS

FIG. 1 is a fragmented perspective view of a multiengine, rocket-propelled vehicle having a cluster of rocket engines mounted on pivotally supported engine-mounting platforms included within a system embodying the principles of the instant invention.

FIG. 2 is a perspective view of one of the engines shown in FIG. 1.

FIG. 3 is a cross-sectional view taken generally along line 3—3 of FIG. 2.

DESCRIPTION OF THE PREFERRED EMBODIMENT

Figure 6:
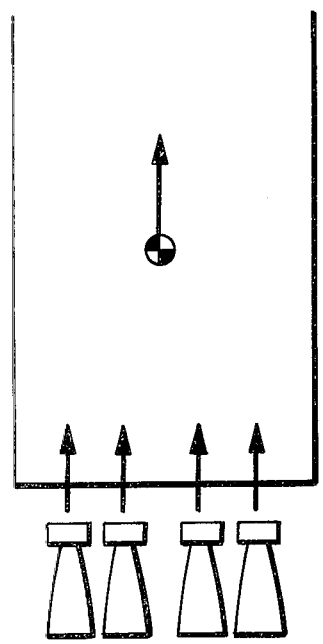
FIGS. 6, 7 and 8, collectively, diagrammatically illustrate the utility of the system which embodies the principles of the instant invention.

Referring now to the drawings, with more specificity, wherein like reference characters designate like or corresponding parts throughout the several views, there is shown in FIG. 1, a multi-engine, rocket-propelled vehicle, generally designated 10, having a cluster of rocket engines, designated 12, provided for propelling the vehicle.

The vehicle 10 is provided for illustrative purposes and forms no specific part of the instant invention. Therefore, a detailed description of the vehicle is omitted in the interest of brevity. However, it is to be understood that the vehicle 10 includes suitable supporting structure, not designated, for the cluster 12 of rocket engines 14 and that the cluster of rocket engines served to propel and impose in-flight directional control over the vehicle 10.

Turning now to FIG. 2, it is noted that each of the rocket engines 14 includes a nozzle 16 and a combustion chamber, not shown, connected with the nozzle in a manner well understood by those familiar with rocket engines. Since the particular structure embodied in the rocket engine 14 also forms no specific part of the instant invention, a detailed description of the engine is omitted. However, it is to be understood that the engine 14, where so desired, includes a suitable combustion chamber supplied with bipropellant components delivered through suitable propellant conduits designated 18 and 20, FIG. 3.

The engine 14 is supported by a gimbal ring 22, of any suitable design. As shown, for illustrative purposes, the gimbal ring 22 is supported by a plurality of axially extensible supporting beams 24 extended from a plurality of linear, angularly spaced actuators 26. As shown, the gimbal ring is connected with the distal ends of the beams 24 through a plurality of pivotal couplings 28 of a suitable design. The actuators 26, in turn, are rigidly affixed to the periphery of an engine-mounting platform 30 and are paired in spaced relation 180° apart.

It will be appreciated that the specific configuration of the gimbal ring 22 and its supporting structure is, in practice, varied where desired. However, it is important to understand that through the gimbal ring 22 the rocket engine 14 is afforded pivotal motion relative to the engine-mounting platform 30 in a manner consistent with current design practices. The purpose of accommodating pivotal motion of the engine 14 relative to the platform 30 is to facilitate engine thrust vector control required for normal flight operations.

The engine-mounting platform 30, in turn, is supported by suitable supporting structure through which pivotal motion of the platform, relative to the longitudinal axis of the engine, is accommodated. As shown, the platform 30 is supported, in part, by a pair of legs 32 projected from a rigid base 34 and connected with the platform 30 through ball joints 36. Of course, the configuration of the base 34 may be varied, as desired. Moreover, a tubular shield 38 is provided for encasing the propellant conduits 18 and 20. As a practical matter, the shield 38 includes a bellows joint 40 through which pivotal motion of the platform 30 is accommodated.

In addition to the legs 32, an hydraulic actuator 42 is provided for supporting the platform 30. The actuator 42 preferably is mounted on the shield 38 and is affixed to the base 34 in a suitable manner. The output shaft of the actuator 42 is connected with the engine-mounting platform 30 through a ball joint, designated 44. It is to be understood that while an hydraulic actuator is shown in the drawings, any suitable linear actuator, such as a worm driven by a worm wheel or and the like, may be employed. Moreover, the platform may be supported by rotating cams employed where so desired. Of course, where only one actuator, as illustrated, is provided pivotal motion of the platform 30 is limited to angular displacement about a single axis. It is, therefore, to be understood that as many actuators as may be desired can be employed for supporting and pivotally oscillating the platform 30 about multiple axes.

Figure 9:
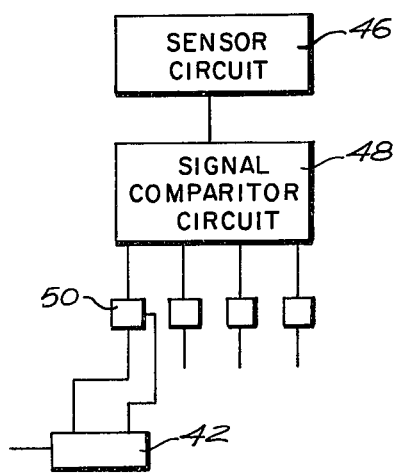
FIG. 9 is a schematic view, in block diagram form, depicting the system.
Figure 4:
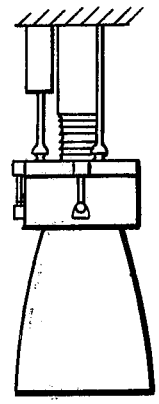
FIGS. 4 and 5 depict alternate operative configurations for one of the engines.
Figure 5:
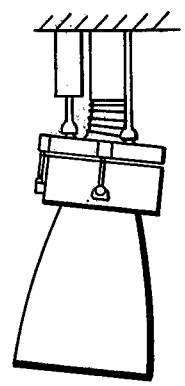

As shown in FIG. 9 a sensor circuit 46 is provided for the vehicle 10 for detecting acceleration in directions angularly related to the longitudinal axis of the vehicle 10. As a practical matter, the sensor circuit 46 includes a plurality of angularly related accelerometers of a suitable design. It is to be understood that the sensor circuit 46 provides directional error signals indicative of instantaneous aberrational acceleration experienced by the vehicle 10 during in-flight operations. The error signals, in turn, are fed to a signal comparator circuit 48 which serves to compare the error signal with a preselected electrical signal indicative of an instantaneous preselected attitude for the vehicle 10. A difference signal is derived and employed to provide driver signals to actuator control circuits 50. The circuits 50 preferably include solenoids, not shown, connected with selector valves and similar devices, also not shown, capable of controlling a delivery of fluid under pressure to the actuators 42. The actuators 42 are then driven in response to fluid delivered thereto under pressure.

OPERATION

It is believed that in view of the foregoing description, the operation of the device will readily be understood and it will be briefly reviewed at this point.

With a cluster 12 of engines 14 supported by a plurality of platforms 30 and mounted aboard a vehicle 10, it is possible to achieve maximum thrust with the thrust vectors thereof being extended in substantial parallelism with the center line of the vehicle 10, as illustrated in FIG. 6.

Figure 7:
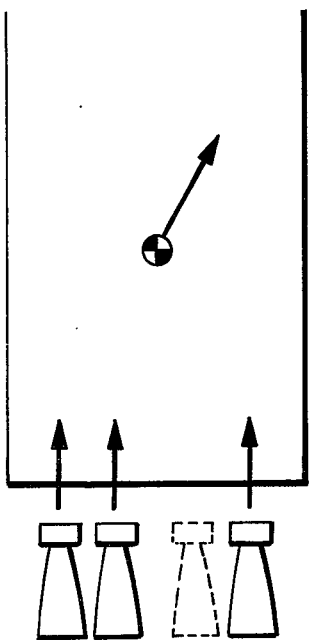
Figure 8:
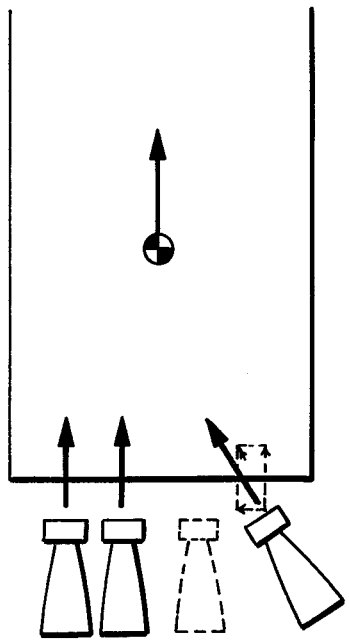

Of course, the engines 14 are supported for pivotal displacement relative to the platform 30 through an activation of the actuators 26 in order to achieve normal guidance control. Thus the thrust vectors for the engines may be oriented in parallelism for achieving maximum thrust. In the event one of the engines is lost, as illustrated by the dotted lines in FIG. 7, through malfunction or for other reasons, the line of flight for the vehicle 10 is varied as indicated by the directional arrow in FIG. 7. Immediately, this change in direction is detected within the sensor circuit 46 with an attendant error signal being delivered to the signal comparator circuit 48. A driver signal is then delivered from the comparator circuit 48 to an appropriate actuator control circuit 50 for causing the actuator 42 connected therewith and connected with a platform 30 disposed adjacent the lost engine to pivotally displace the platform 30, as indicated in FIG. 8. Of course, as the platform 30 is displaced the thrust vector of the engine supported thereby is relocated sufficiently for stabilizing the direction of flight for the vehicle 10, as indicated by the directional arrow in FIG. 8.

While not shown, it is to be understood that each of the engine-mounting platforms 30 for the rocket engines 14 can be repositioned during flight for simultaneously relocating the thrust vectors causing the thrust vectors to pass through the center of gravity of the vehicle 10 as excursion occurs. Thus a tracking of the center of gravity is facilitated.

Therefore, while the system herein described has particular utility in overcoming the effects of engine malfunction, without requiring a reduction in thrust output, for imposing directional stability, it should be apparent that it is possible to utilize the system for achieving in-flight change of modes of operation from parallel thrusting to center-of-gravity thrusting.

In view of the foregoing, it should be apparent that the system of the instant invention provides a practical solution to the perplexing problem of achieving in-flight reorientation of thrust vectors for rocket engines in a simplified and practical manner.

Although the invention has been herein shown and described in what is conceived to be the most practical and preferred embodiment, it is recognized that departures may be made therefrom within the scope of the invention, which is not to be limited to the illustrative details disclosed.

I claim:

1. In a system particularly adapted for use in imposing directional control over a rocket-propelled vehicle, the improvement comprising:
   A. a gimbal ring adapted to receive in supporting relation a rocket engine having a thrust axis concentrically related thereto;
   B. an engine mounting platform supported for pivotal motion about an axis lying in a plane transversely related to the thrust axis of said rocket engine;
   C. means for imparting pivotal motion to said gimbal ring about a plurality of axes extended diametrically therethrough including an annular array of uniformly spaced linear actuators rigidly affixed to said platform and having a plurality of axially extensible support beams disposed in substantial parallelism and connected to said gimbal ring; and
   D. actuating means coupled with said engine mounting platform for imparting thereto pivotal oscillatory motion about said axis lying in a plane transversely related to the thrust axis of said rocket engine.

2. In the system of claim 1, the improvement further comprising:
   A. sensing means for providing error signals indicative of instantaneous aberrational acceleration imparted to said vehicle;
   B. a signal comparator circuit connected with said sensing means including means for comparing preselected intelligence signals indicative of normal acceleration with instantaneously derived signals indicative of aberrational acceleration for providing difference signals and means responsive to said difference signals for providing driver signals; and
   C. a control circuit including means connected with said signal comparator circuit and means connected with said actuating means for receiving said driver signals and means responsive to said driver signals for activating said actuating means for imparting pivotal motion to said platform for thereby reducing aberrational acceleration.

3. The improvement of claim 1 wherein said actuating means includes an hydraulic ram.

* * * * *